(12) United States Patent
Lugiai et al.

(10) Patent No.: US 9,325,584 B2
(45) Date of Patent: Apr. 26, 2016

(54) ENTERPRISE APPLICATION INTEGRATION ON CLIENT COMPUTING DEVICES

(71) Applicant: Softphone SRL, Milan (IT)

(72) Inventors: Alan Lugiai, Brembate di Sopra (IT); Francesco Falanga, Mercogliano (IT)

(73) Assignee: SOFTPHONE S.R.L., Milan (IT)

( * ) Notice: Subject to any disclaimer, the term of this patent is extended or adjusted under 35 U.S.C. 154(b) by 97 days.

(21) Appl. No.: 14/202,865

(22) Filed: Mar. 10, 2014

(65) Prior Publication Data

US 2015/0256419 A1    Sep. 10, 2015

(51) Int. Cl.
*G06F 15/16* (2006.01)
*H04L 12/24* (2006.01)

(52) U.S. Cl.
CPC .................................. *H04L 41/5064* (2013.01)

(58) Field of Classification Search
USPC ........................... 709/227, 242, 245, 246, 243
See application file for complete search history.

(56) References Cited

U.S. PATENT DOCUMENTS

| 2002/0038309 A1 | 3/2002 | Perkins et al. |
| 2012/0029901 A1 | 2/2012 | Nielsen |
| 2012/0185229 A1 | 7/2012 | Perrett |

*Primary Examiner* — Lan-Dai T Truong
(74) *Attorney, Agent, or Firm* — Foley & Lardner LLP; James C. De Vellis

(57) ABSTRACT

Systems and methods of facilitating data integration between customer relationship management (CRM) applications on client computing devices are provided. A contact toolbar application of a client computing device can publish a connection point within a user workstation of the client computing device. First and second CRM applications can establish connections with the connection point. The user workstation can create an integration channel via the connection point between the contact toolbar application, the first CRM application, and the second CRM application, for real time exchange of computer telephony integration data between the contact toolbar application and at least one of the first CRM application and the second CRM application.

21 Claims, 14 Drawing Sheets

FIG. 8

Client Computing Device — 120

File  Edit  View  Navigate  Query  Tools  Help

==Interactions== ▼ ▶  — 530

Contact:
Home | Accounts | Contacts | Opportunities | Sales Orders | Service
Contacts Home | Contacts List | Consumers List | Personal Contacts List | Charts Francesco Falanga
Menu ▼ | New | Delete | Query

| | | | |
|---|---|---|---|
| Last Name:* | Falanga | Account Name: | soulsoftware |
| First Name:* | Francesco | Account Address: | |
| Middle Initial: | | Address Line 2: | |
| Mr/Ms: | Dr. ▼ | City: | |
| Job Title: | day | State: | ▼ |
| Work Phone#: | +393555584055 | Zip Code: | |
| Work Fax#: | | Country: | ▼ |
| Mobile Phone#: | | | |
| Home Phone#: | | | |
| Email: | | | |

1 of 1+  ◀ ▶

Saved Queries: [         ] ▶

More Info | Activities | Notes | Opportunities | Service Requests | Attachments | Calender | Orders | Duplicate Contacts | Tools Menu ▼ | New | Delete | Query

| New Description | Type | Start | End | Due | Status | Priority | Owner |
|---|---|---|---|---|---|---|---|
| Call Inboundfrom+Call-Inbound | | 3/26/2014 08:53:19 | 3/26/2014 08:53:19 | 3/26/2014 08:53:19 | In Progress | | Agent1 |
| Call Inboundfrom+Call-Inbound | | 3/18/2014 11:23:01 | 3/18/2014 11:23:01 | 3/26/2014 11:23:01 | In Progress | | Agent1 |
| Call Inboundfrom+Call-Inbound | | 3/18/2014 11:17:37 | 3/18/2014 11:17:37 | 3/18/2014 11:17:37 | In Progress | | Agent1 |
| Call Inboundfrom+Call-Inbound | | 3/18/2014 11:17:19 | 3/18/2014 11:17:19 | 3/18/2014 11:17:19 | In Progress | | Agent1 |
| Call Inboundfrom+Call-Inbound | | 3/18/2014 11:15:25 | 3/18/2014 11:15:25 | 3/18/2014 11:15:25 | In Progress | | Agent1 |

ENTERPRISE APPLICATION INTEGRATION ON CLIENT COMPUTING DEVICES

BACKGROUND

Computing devices can have applications that communicate via a computing network with remote servers to obtain data and provide the data for display by the computing devices. The applications can use different operating systems or be associated with different host servers.

SUMMARY

At least one aspect is directed to a system of facilitating computer telephony integration between customer relationship management (CRM) applications on client computing devices in a contact center environment. A client computing device in the contact center environment can include a user workstation. The user workstation can include a contact toolbar application, a first CRM application, and a second CRM application to provide computer telephony integration data for display by the client computing device. The contact toolbar application can execute on the client computing device to publish a connection point within the user workstation. The client computing device can execute a connector plugin of the first CRM application to identify the connection point and to establish a first connection with the connection point. The client computing device can execute a connector plugin of the second CRM application to identify the connection point and to establish a second connection with the connection point. The user workstation can establish an integration channel via the connection point between the contact toolbar application, the first CRM application, and the second CRM application, for real time exchange of computer telephony integration data between the contact toolbar application and at least one of the first CRM application and the second CRM application.

At least one aspect is directed to a computer implemented method of facilitating interaction between customer relationship management (CRM) applications in a contact center environment on a client computing device having a user workstation. The user workstation can include a contact toolbar application, a first CRM application, and a second CRM application. The method can execute the contact toolbar application of the client computing device to publish a connection point within the user workstation of the client computing device. The method can execute, by the client computing device, a connector plugin of the first CRM application to identify the connection point and to establish a first connection between the first CRM application and the contact toolbar application via the connection point, and can execute, by the client computing device, a connector plugin of the second CRM application to identify the connection point and to establish a second connection between the first CRM application and the contact toolbar application via the connection point. The method can establish, by the user workstation, an integration channel via the connection point between the contact toolbar application, the first CRM application, and the second CRM application, for real time exchange of computer telephony integration data between the contact toolbar application and at least one of the first CRM application and the second CRM application.

At least one aspect is directed to a computer readable storage device storing instructions that when executed by one or more data processors, cause the one or more data processors to perform operations for interaction between client applications on a client computing device having a user workstation, the user workstation including a contact toolbar application, a first CRM application, and a second CRM application. The operations can include executing the contact toolbar application of the client computing device to publish a connection point within the user workstation of the client computing device, and executing, by the client computing device, a connector plugin of the first CRM application to identify the connection point and to establish a first connection between the first CRM application and the contact toolbar application via the connection point. The operations can include executing, by the client computing device, a connector plugin of the second CRM application to identify the connection point and to establish a second connection between the first CRM application and the contact toolbar application via the connection point. The operations can include establishing, by the user workstation, an integration channel via the connection point between the contact toolbar application, the first CRM application, and the second CRM application, for real time exchange of computer telephony integration data between the contact toolbar application and at least one of the first CRM application and the second CRM application.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 8 is a display depicting one example of a client application on a client computing device, according to an illustrative implementation;

FIG. 9 is a display depicting one example of a client application on a client computing device, according to an illustrative implementation;

DETAILED DESCRIPTION

Figure 1:
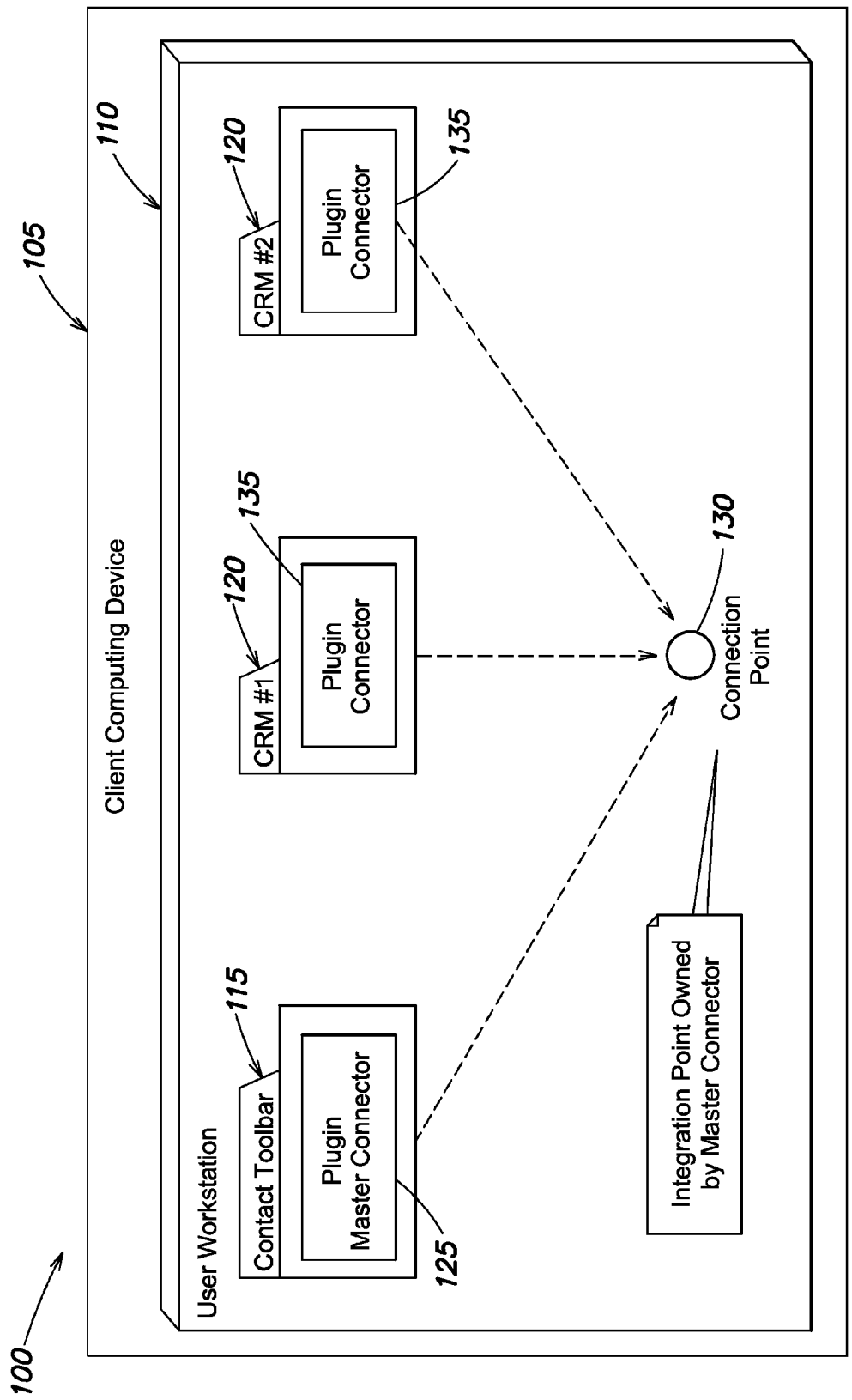
FIG. 1 is a block diagram depicting one example environment for client application interaction on a client computing device, according to an illustrative implementation.

Following below are more detailed descriptions of various concepts related to, and implementations of, methods, apparatuses, and systems of providing information via a computer network. The various concepts introduced above and discussed in greater detail below may be implemented in any of numerous ways, as the described concepts are not limited to any particular manner of implementation.

Customer Relationship Management (CRM) applications can manage interactions between a company and their customers over various contact channels, such as email, or instant messaging communications channels. Contact centers such as call centers can access or coordinate between multiple CRM applications. The CRM applications can evaluate the data collected via the various contact channels to create or provide information about customers. For example, a contact center on behalf of a business entity can include or aggregate data from customer contacts via multiple channels to create a robust profile of clients. This data can be used for client relationship, customer support, marketing research, or other purposes.

The contact center can include a number of agent or user workstations such as client computing devices connected to the internet or other communication network to communicate with customer computing devices, for example via telephone, voice over internet protocol, short message service, instant message, or other mode of communication to manage data of various customers. For example, an operator of a client computing device in a call center can receive a call from a customer via the client computing device and also retrieve other data about that customer based on previous interactions, such as information about a pending customer order or service request, e.g., during the call.

Different CRM applications that execute on one client computing device (or execute on a server and display output on one client computing device) may exchange data with each other in various ways. For example, the CRM applications may be client-server or web based applications so that the exchange of information between two or more CRM applications includes a server to server communication of the exchanged data between a server associated with the first CRM application and a server associated with a second CRM. A new user interface can be created on the client computing device to display the data received from the servers of the different CRM applications. This data can be provided for display by the client computing device via the internet or other computer network.

Systems and methods of the present disclosure relate generally to computer telephony integration of multiple CRM applications by a client computing device. The CRM applications can be different applications, provided for example by different vendors. Different CRM applications can include different information about customers and can execute on or display output data on the client computing device.

To facilitate communication between different CRM applications on, for example, a single client computing device in a contact center environment, the client computing device can be provided with a contact toolbar application. The contact toolbar application can execute on the client computing device to publish, on the client computing device, a connection point. Multiple CRM applications executing on or providing data to the client computing device can identify this connection point and can each establish a connection with the connection point. The connections establish an integration channel that connects, on the client computing device, the contact toolbar application with the CRM applications, and connects the CRM applications with each other.

The integration channel provides a communication channel on the client computing device that integrates the contact toolbar, or other computer telephony integration application, with CRM or other enterprise applications and provides for client side communication between these applications on the client computing device to, for example, retrieve customer data about a customer while receiving (or during) a telephone call with that customer. In this example, rather than server to server communication, the contact toolbar and the CRM applications can communicate with each other via the integration channel, for example to exchange real time events or data, within the client computing device. This exchanged data can be retrieved by the contact toolbar from its corresponding server, or can be retrieved by the CRM application from its corresponding server. However the exchange of data between the contact toolbar and the CRM application can occur on the client side via the integration channel and not via any server side communication channel between the respective servers. Thus, the systems and methods described herein can provide a client-based bi-directional multi-session event based communication protocol to allow intra-client communication between CRM applications and the contact toolbar application via the integration channel.

FIG. 1 illustrates an example environment 100 for client application interaction on a client computing device 105. The environment 100 may include a call center or other contact center having a number of client computing devices 105 to manage customer interaction via CRM applications, or to manage supply chain, inventory, shipping, or other types of applications such as human resources or employee benefit (e.g., healthcare) data for a business.

The client computing devices 105 can include computing devices to execute or communicate with CRM applications to access or provide computer telephony data integration with CRM applications, for example as part of an enterprise application integration framework. The client computing devices 105 can include desktop computers, laptop computers, tablet computers, smartphones, personal digital assistants, thin client computing devices, virtual computing devices, mobile devices, end user computing devices, consumer computing devices, clients, and other computing devices. The client computing devices 105 can include user interfaces such as microphones, speakers, touchscreens, keyboards, pointing devices, a computer mouse, touchpad, or other input or output interfaces. The client computing devices 105 can execute or display the results of CRM or other applications and can provide for the real time exchange of telephony integration data between CRM or other applications within the client computing device 105, e.g., in the absence of a server to server exchange of the telephony integration data between servers associated with respective CRM or other applications.

The client computing device 105 can include at least one user workstation 110. In some implementations the client computing device 105 is the agent workstation 110, however the user workstation 110 can also include a virtual machine or virtual client device isolated from the remainder of the client computing device 105. The user workstation 110 can include at least one processor (e.g., of the client computing device 105) to execute CRM or other applications. In some implementations, an operator of the client computing device 105 can logon to access the user workstation 110.

The user workstation 110 can include at least one contact toolbar application 115 and at least one CRM application 120. For example, in a call center or other contact center environment, the client computing device 105 can execute the contact toolbar application 115 to receive, accept, or manage a customer request such as a phone call. The contact toolbar application 115 may include a script and can display telephone call or other data in an interface of the client computing device 105.

The contact toolbar application 115 can execute to accept incoming customer communication requests via various communication channels. For example, the client computing device 105 can communicate with the networks such as the internet, local area, wide area, satellite, telephone, or hybrid communication networks, and the contact toolbar application 115 can accept a phone call, voice over internet protocol communication, chat, short message service, instant message service, email, fax, or other communication from a customer via those networks. The contact toolbar application 115 can acquire contact or other identifying information of the customer such as a name, username, logon information, or password, for example. This information can be received from the customer during a call, or can be retrieved from a database associated with the client computing device 105. In, for example, a contact center environment, the contact toolbar application 115 manages customer contact interaction. The contact toolbar application 115 can indicate a call or message from a customer and allows for persistent bi-directional communication with a customer, from the client computing device 105.

In some implementations, the contact toolbar application 115 provides a display in a user interface of the client computing device 105. The operator of the client computing device 105 can provide a username, password, or other details into the interface to logon to the contact toolbar application 115. For example, in a call center environment, the operator can logon to the contact toolbar application 115 to obtain customer information such as a customer identification, or customer interaction information such as historical data pertaining to that customer (e.g., call history data). The contact toolbar application 115 can execute on the client computing device 105 to perform answer or hang-up interactions to initiate or terminate a call with a customer, and can include record, pause, resume, or forward operations to control the communication with the customer. The contact toolbar application 115 can allow the operator (e.g., user) to attach information to a record of the call such as notes of the call or other information about the customer. The contact toolbar application 115 can include a script in an extensible format, language or protocol designed to accommodate the addition of hooks, application programming interfaces, or plugins to allow the provide additional functionality such as the ability establish client-side communication channels on the client computing device 105 to communicate with at least one CRM application 120.

The CRM applications 120 can include various customer relationship applications for managing a company's interactions with current, future or potential customers. A business or other organization can use the CRM applications 120 to organize, automate, synchronize, or otherwise process data related to employees, customers, or potential customers of the organization. For example, the CRM applications 120 can be used to process employee or customer data related to sales, marketing, customer service, or technical support. In some implementations, the CRM applications 120 are server side applications that, for example, are specialized for a market segment. Data from the CRM applications 120 can be provided for display in a user interface of the client computing device 105 via the internet or other network communication such as an intranet. The CRM applications 120 can include (e.g. in an associated database) or access information about customer interactions and provide or make this data available to the contact toolbar application 115.

To enable, for example, direct client-side communication between the contact toolbar application 115 and at least one CRM application 120, the contact toolbar application 115 can include at least one master connector plugin 125. The master connector plugin 125 can include a software component that can acts as an extension or add-on of the contact toolbar application 115 to facilitate client side asynchronous bi-directional communication between the contact toolbar application 115 and the CRM applications 120. For example, the computer telephony data can be transmitted intermittently through these components rather than in a steady or continuous stream. The bi-directional communication or integration between the contact toolbar application 115 and the CRM applications 120 can occur within the client computing device 105 (or within the user workstation 110), for example in the absence of intervening servers in the communication path between the contact toolbar application 115 and the CRM applications 120. The master connector plugin 125 can include script or code such as C#, C++, Java, or Java script.

The master connector plugin 125 can execute on the client computing device 105, e.g., within the contact toolbar application 115, to publish at least one connection point 130 such as an http endpoint or internet address. The connection point 130 can provide or include a shared public channel on the client computing device 105, published by the master connector plugin 125 to allow client side connection and communication between the contact toolbar application 115 and the CRM applications 120. The connection point 130 can support http protocols or other application protocols. In one implementation, the connection point 130 can only be contacted by tools of the client computing device 105 or the user workstation 110. For example other applications executing outside the workspace of the user workstation 110 (e.g., on computing devices other than the client computing device 105) can be prohibited or blocked by the master connector plugin 125 from accessing or connecting with the connection point 130. In some implementations, communications via the connection point 130 between components of the client computing device (e.g., the contact toolbar application 115 and the CRM applications 120) occur directly, e.g., on the client side or within the client computing device 105 and without passing through an intermediary server.

The CRM applications 120 can each include at least one connector plugin 135. The connector plugins 135 can include software components that can act as extensions or add-ons of the CRM applications 120 to facilitate client side bi-directional communication between the contact toolbar application 115 and the CRM applications 120. The connector plugins 135 can include script or code such as C#, C++, Java, or Java script. In some implementations, the connector plugin 135 executes on, within, or as part of the CRM application 120 to identify the connection point 130 within the user workstation 110.

The connector plugin 135 can detect the connection point 130 and register the CRM application 120 (or the connector plugin 135) with the connection point 130 to establish a bi-directional integration channel, via the connection point 130, between the contact toolbar application 115 and the CRM application 120 associated with the connector plugin 135. In some implementations, multiple connector plugins 135 of different CRM applications 120, or different instances (e.g., screens) of the same CRM application 120) on the client computing device 105 can identify and register themselves with the same connection point 130. In this example, the integration channel can provide for communication between the contact toolbar application 115 and any CRM application 120 registered with the connection point 130. The connector plugins 135 can receive data or events from the master connector plugin 125 via the integration channel and the connector plugins 135 can execute custom actions with or for the corresponding CRM application 120. In this example, the contact toolbar application 115 can access data of the CRM applications 120 via the integration channel, e.g., directly, and no via an intervening server, such as a server associated with one of the CRM applications 120. In this example, such a server does not communicate directly with the contact toolbar application 115, via the internet or other communications or data network. In some implementations, the master connector plugin 125 receives an indication that the connector plugin 135 has identified or registered with the connection point 130. In response, the master connector plugin 125 can generate the integration channel.

In some implementations, for example in a call center environment, the master connector plugin 125 publishes an address on the client computing device 105 of the connection point 130. The CRM applications 120 can execute the connector plugins 135 to identify and register their associated CRM applications 120 with the connection point 130 to establish the client side integration channel between the CRM applications and the contact toolbar application 115. When, for example, the contact toolbar application 115 identifies an incoming call or other event, the contact toolbar application 115 can communicate with one or more of the CRM applications 120 to, for example, obtain customer information from the CRM applications 120 via a client side communication internal to the client computing device 105, or between multiple client computing devices 105. For example, a user can operate multiple computing devices 105 from the contact center and the CRM application 120 from one computer device 105 can communicate with the contact tool via the integration channel 205, for example using a local area network connection between the two computing devices 105.

Figure 12:
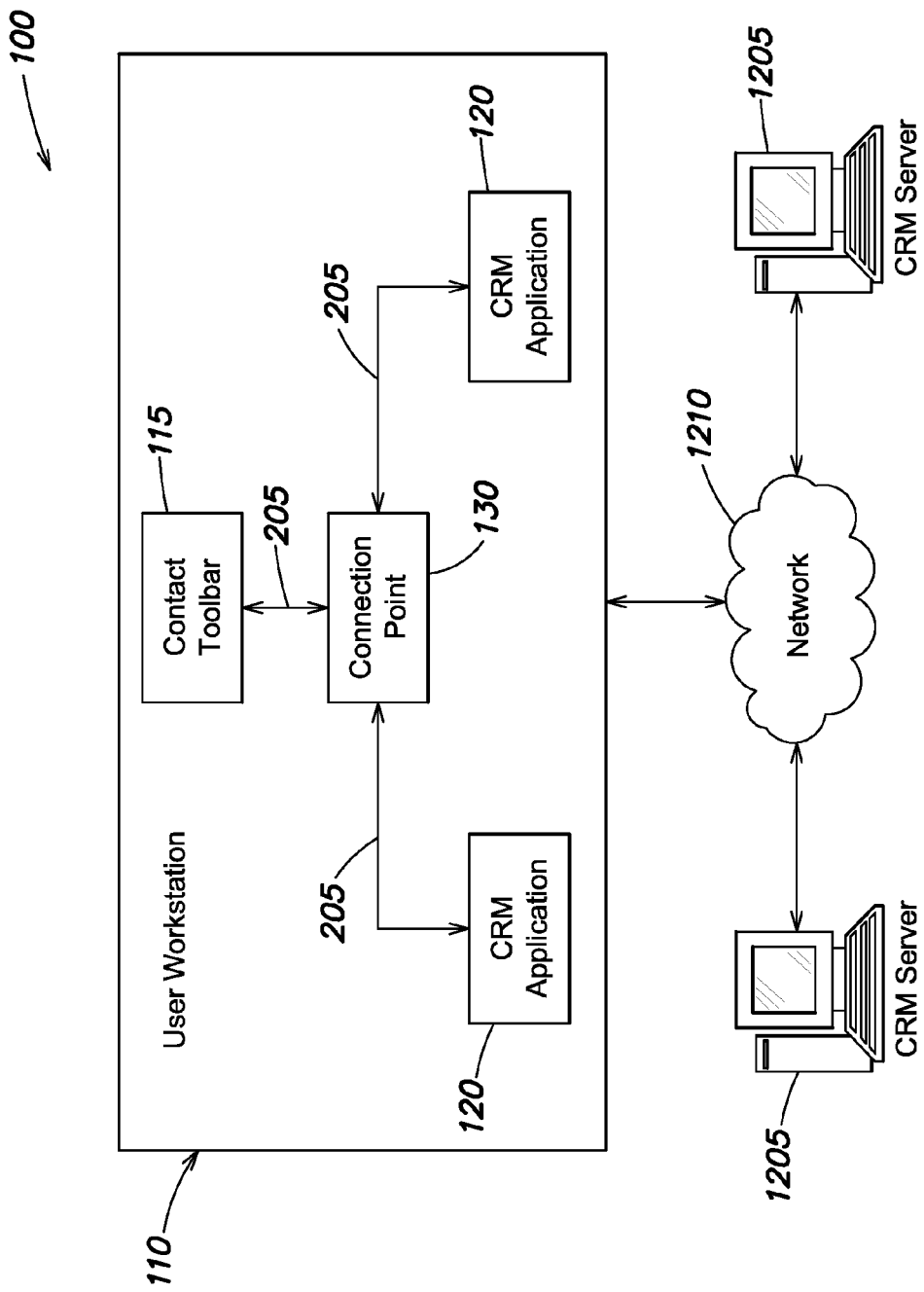
FIG. 12 is a block diagram depicting one example environment for client application interaction on a client computing device, according to an illustrative implementation.

Referring ahead, FIG. 12 illustrates an example environment 100 for client application interaction to facilitate computer telephone integration on the user workstation 110, e.g., of the client computing device 105. The contact toolbar application 115 (or component thereof such as the master connector plugin 125) publishes the connection point 130 within the user workstation 110. The CRM applications 120 execute their respective connector plugins 135 to identify and register to the connection point 130 to establish the integration channel 205. The integration channel 205 includes a communications channel for client side bidirectional communication between different CRM applications 120 and the contact toolbar application 115. The communication between any of the CRM applications 120 and the contact toolbar application 115 via the integration channel 205 can occur directly, e.g., within the user workstation 110 or the client computing device 105, or without passing through an intervening server, such as any of the CRM servers 1205 or the network 1210 such as the internet, a local, wide, or other area network, telephone voice or data network, satellite network, or combinations thereof.

In some implementations, the integration channel 205 establishes a loosely coupled distributed system between the CRM applications 120 or between the contact toolbar application 115 and the CRM applications 120. For example, in the loosely coupled system one CRM application 120 may not make use of the computer telephony integration data of another CRM application 120. In this example, the CRM applications 120 may send respective telephone integration data to the contact toolbar application independently, so that data sent by one CRM application 120 is not used by or relevant to data sent by another CRM application 120.

For example, the CRM applications 120 can each be associated with one or more corresponding CRM server 1205. In some examples, communication between CRM applications 120 or between CRM applications 120 and the contact toolbar application 115 may be server based, or server-side communications. For example, a first CRM application 120 can communicate a request to its corresponding CRM server 1205 via the network 1210. That CRM server 1205 can provide a response to the request, via the network 1210, to another CRM server 1205, which then communicates a response to a second CRM application 120 or to the contact toolbar application 115 via the network 120 where this integrated data may be displayed in a dedicated user interface of the user workstation 110. This server based computer telephony data integration can require load balancing between the CRM servers 1205, hindering scalability. Further, the fault tolerance is low, as the CRM servers 1205 in this server side architecture is a single point of failure architecture. In this server-side, or server to server based communication example, the CRM applications 120 for managing current and potential customers typically cannot directly communicate with each other via an intra-client computing device communication to share data or business rules, communicating instead such data in a server-to-server manner. In some implementations, establishing the client side integration channel 205 provides an alternative to this server based communication.

In some implementations, rather than the above server-side approach, the integration channel 205 is established on the client computing device 105, e.g., the user workstation 110. By providing the connection point 130 and using it to establish the integration channel 205 on user workstation 110, computer telephony data can be exchanged in real time (e.g., during customer communication such as a phone call, even if there is a pause or delay while data is retrieved) via client-side communication in the absence of the server to server communication of the above example. When providing computer telephony data via the integration channel 205, data can be exchanged directly between CRM applications 120 on the client computing device 105. In some implementations, this exchange of data through the integration channel 205 is not routed through the CRM servers 1205 and is not routed through the network 1210.

In some implementations, the integration channel 205 is exclusively for use of the contact toolbar application 115 and the CRM applications 102 for the real time exchange of computer telephony integration data. For example, the connection point 130 can deny or refuse to register additional applications of the client computing device 105 from accessing the integration channel 205, despite an affirmative request received by the master connector plugin 125 from the additional application requesting registration with the connection point 130 or access to the integration channel 205.

Figure 2:
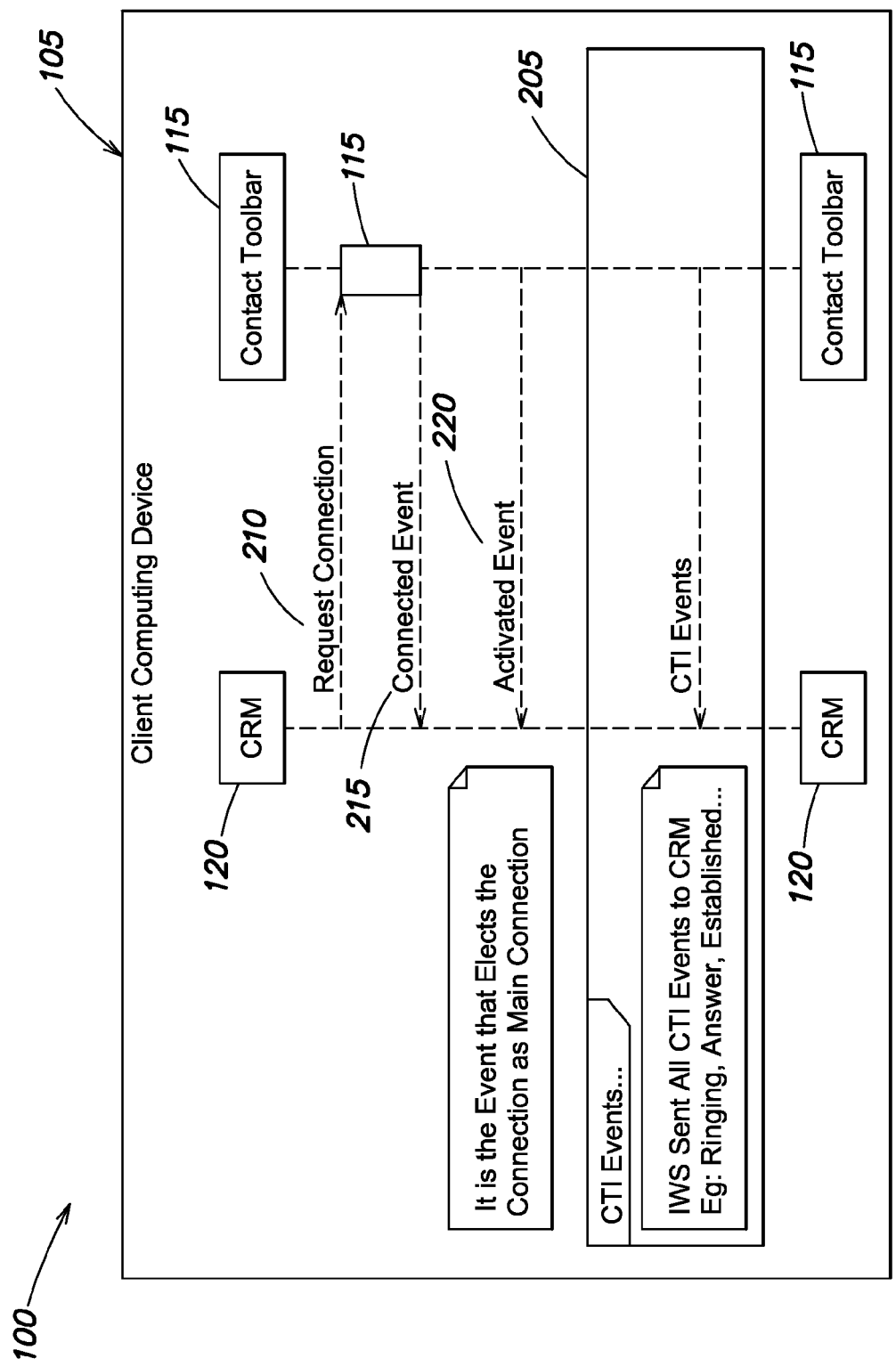
FIG. 2 is a block diagram depicting one example environment for client application interaction on a client computing device, according to an illustrative implementation.

FIG. 2 illustrates an example environment 100 for client application interaction on a client computing device 105. For example, to communicate via the integration channel 205, the contact toolbar application 115 can receive a request 210 from at least one of the CRM applications 120 to establish a connection to the connection point 130. In response, the contact toolbar application 115 can provide a connected event communication 215 to the CRM application 120, establishing the connection via the integration channel 205. In some implementations, the contact toolbar application 115 sends an activated event communication 220 to the CRM application 120. In some implementations, a plurality of CRM applications 120 are connected with the contact toolbar application 115, but exactly one of the connected CRM applications 120 receives the connected event 215. Should that one CRM application 120 become deactivated, e.g., intentionally or resulting from a system failure, the contact toolbar application 115 can provide the activated event communication 215 to a different CRM application 120 to activate a different CRM application 120 for the exchange of data with the contact toolbar application 115. With the integration channel 205 established, via publication of the connection point 130 by the contact toolbar application 115 and registration to the connection point 130 by the CRM application 120, data can then be communicated between the contact toolbar application 115 and the CRM application 120 via the integration channel 205. This data can include computer telephony integration (CTI) data such as data relating to the initiation of a call (ringing), the answering of a call, or the establishment of a telephone or voice over internet protocol call, for example. The CTI data can be provided to at least one CRM application 120 in real time via the integration channel 205 and data about, for example, a customer associated with the call can be retrieved from the CRM application 120.

Figure 3:
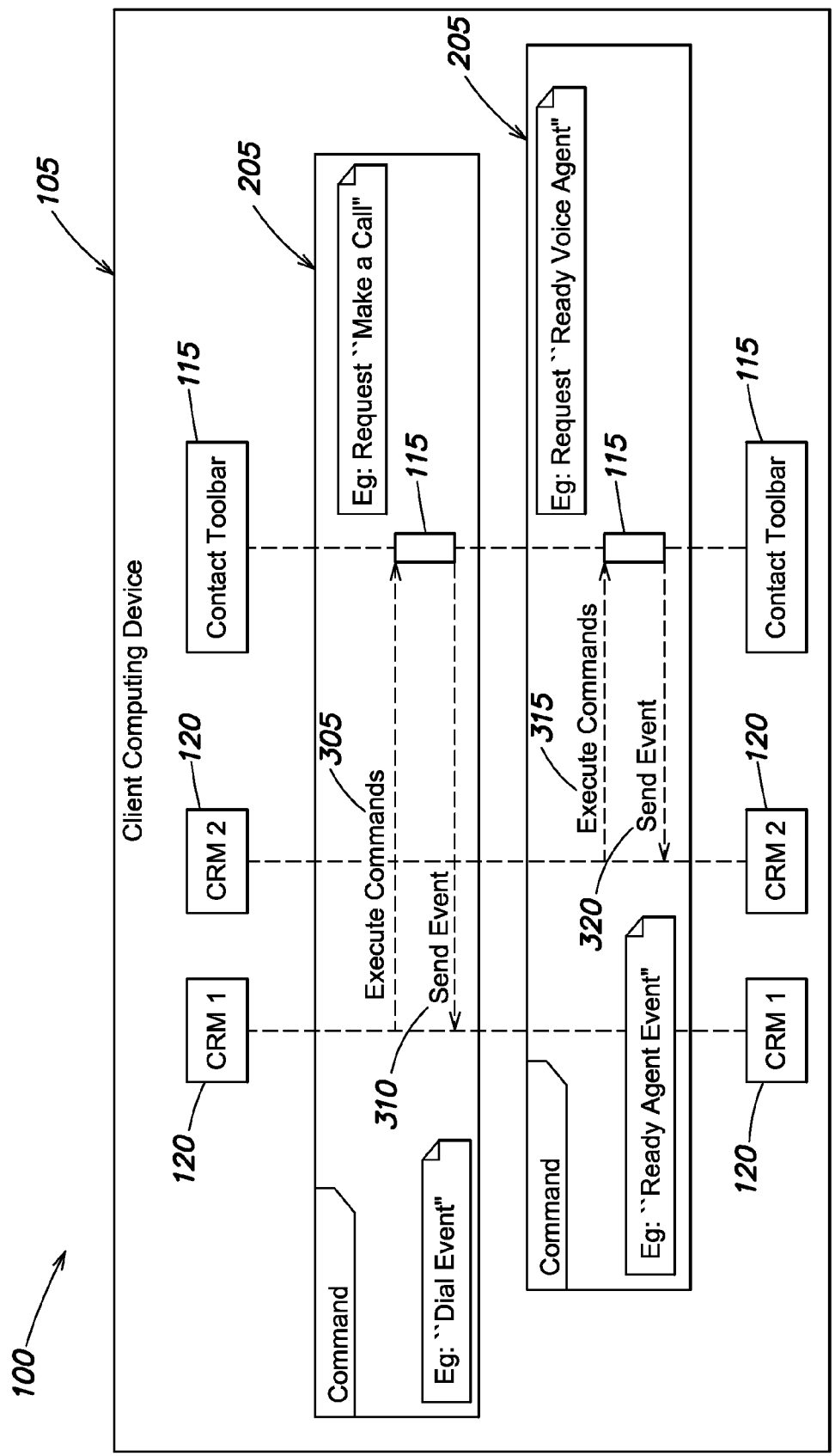
FIG. 3 is a block diagram depicting one example environment for client application interaction on a client computing device, according to an illustrative implementation.

FIG. 3 illustrates an example environment 100 for client application interaction on a client computing device 105. For example, commands and events can be sent between the contact toolbar application 115 and the CRM applications 120 via the integration channel 205. The commands, for example, can include requests sent from the CRM applications 120 to the contact toolbar application 115 via the integration channel 205. The events can be sent from the contact toolbar application 115 to the CRM applications 120 via the integration channel, for example responsive to the commands.

In one example of integrated client-side communication in a call center environment, a first CRM application 120 can send a command 305 via the integration channel 205 to the contact toolbar application 115, such as a request to make a call. In response, the contact toolbar application 115 can send an event 310 such as a dial event back to the first CRM application 120 whereby the user workstation affects a telephone or voice over internet protocol call. A second CRM application can also send a different command such as a command 315 via the integration channel 205 to the toolbar application, such as a request to ready a voice agent, e.g., to alert a human operator of a forthcoming telephone or voice over internet protocol call. In response, the contact toolbar application 115 can send an event 320 such as a ready agent event to the CRM application 120 to alert an operator to prepare for a live call with, for example, a customer.

Figure 4:
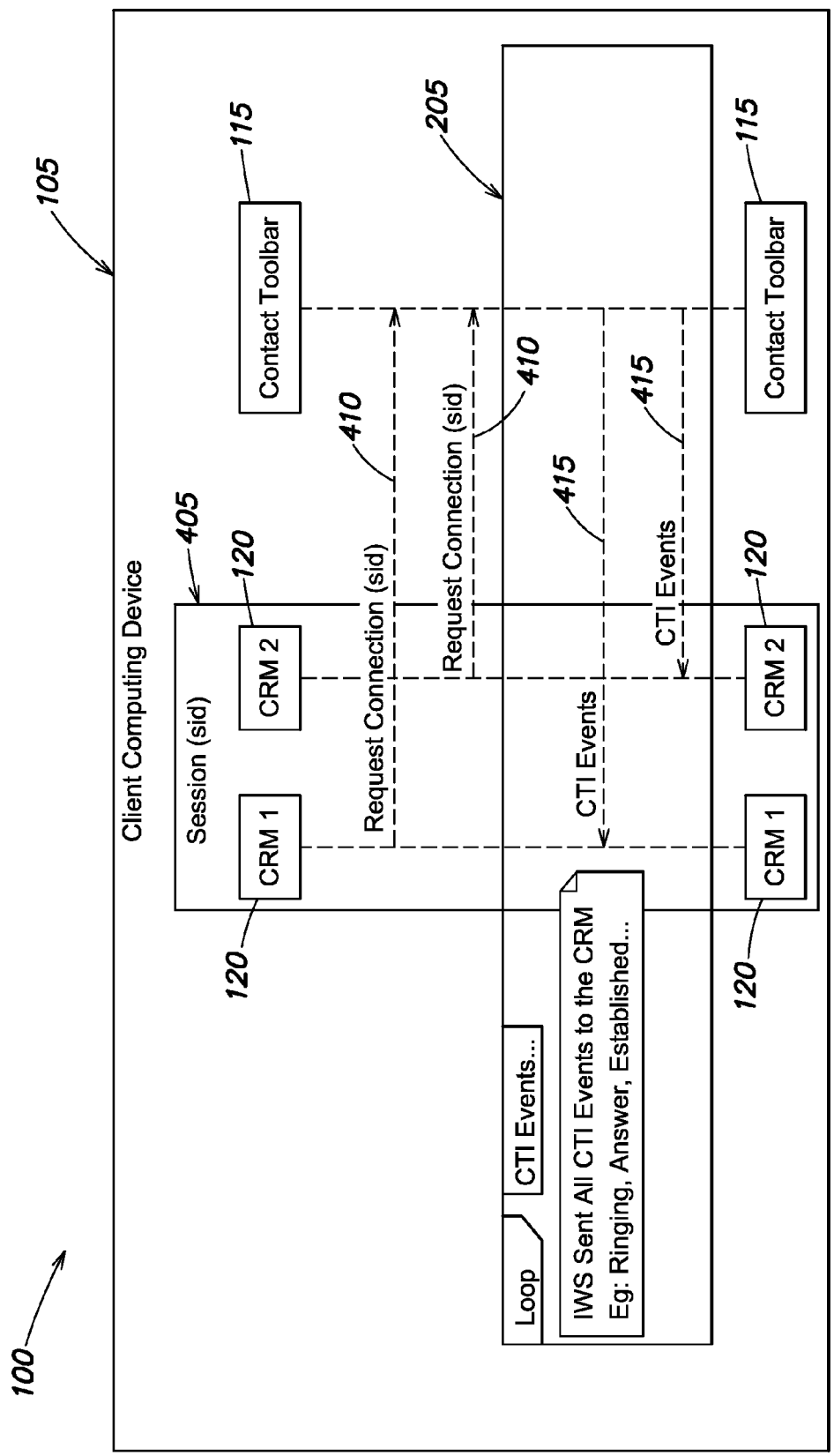
FIG. 4 is a block diagram depicting one example environment for client application interaction on a client computing device, according to an illustrative implementation.

FIG. 4 illustrates an example environment 100 for client application interaction on a client computing device 105. For example, the user workstation 110 can join one or more CRM applications 120 in a unique session 405 via the integration channel 205. The session 405 can be established responsive to requests 410 from the CRM applications 120 to the contact toolbar application 115. With the session 405 established, the contact toolbar application 115 can broadcast a CTI event 415 to more than one CRM application 120 via the integration channel 205.

FIGS. 1-4 generally depict client side communication within the client computing device 105 between the contact toolbar application 115 and different CRM applications 120 via the integration channel 205, without the communicated events or commands passing through an intermediary server. In this way, the contact toolbar application 115 can communicate directly via the integration channel 205 with the CRM applications 120 in the absence of an intermediate server, such as a server associated via a computer network with one of the CRM applications 120.

Figure 5:
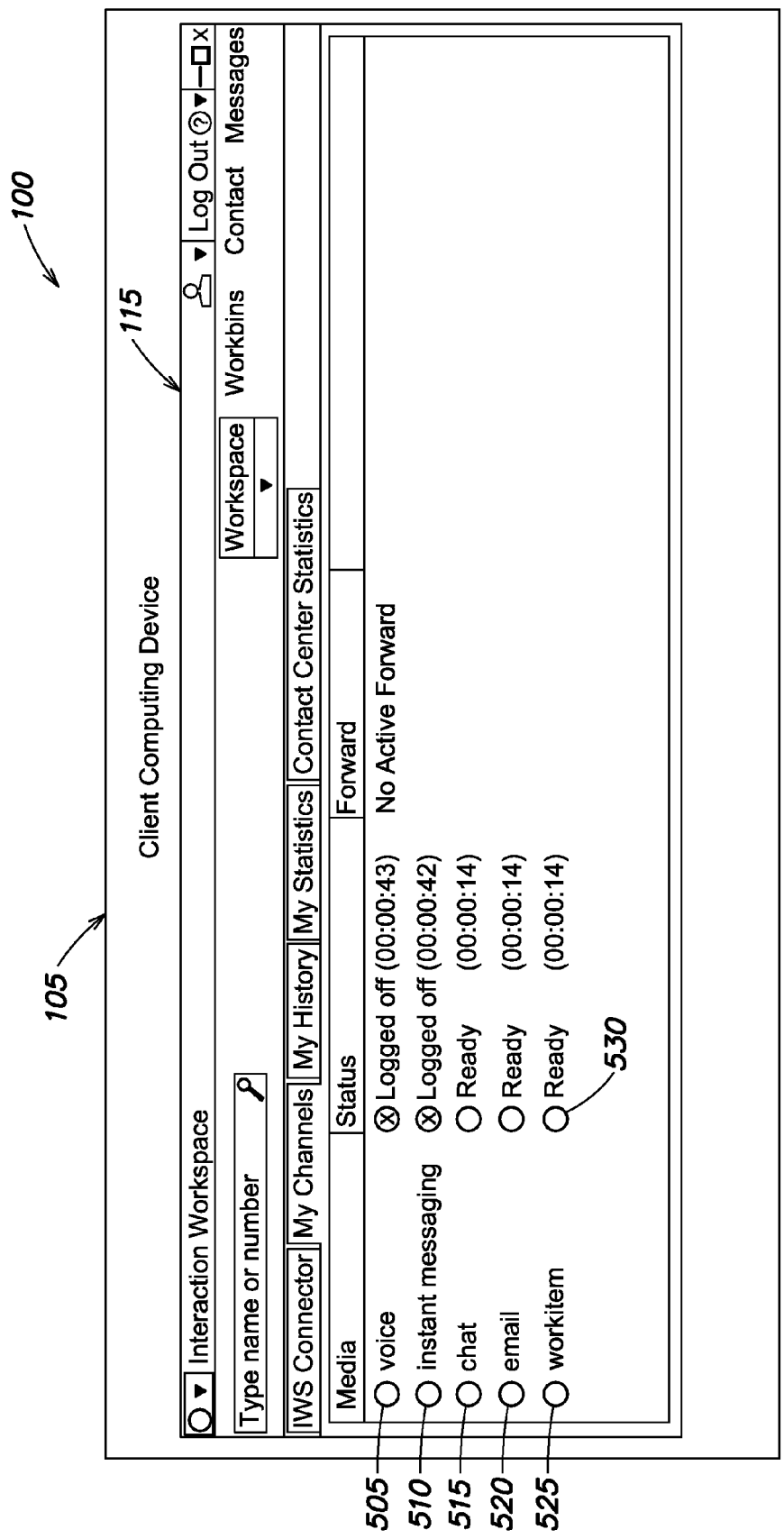
FIG. 5 is a display depicting one example of a contact toolbar application on a client computing device, according to an illustrative implementation.

FIG. 5 illustrates an example display of the contact toolbar application 115 in a user interface of the client computing device 105. The contact toolbar application 115 allows the operator of the user workstation 110 to receive, accept or manage customer requests, such as a voice communication 505, an instant messaging communication 510, a chat communication 515, an email communication 520, or a work item communication 525. For example, the contact toolbar application 115 can display an indication that the communications (e.g., 505-525) are in an active state (e.g., by displaying the word "ready" or other indicator) or an inactive state (by displaying the words "logged off" or other indicator). The communications 505-525 can also include a display 530 such as a color coded or symbol display that indicates an active, inactive, or other state. The contact toolbar application 115 can initiate or establish the communications 505-525 with customers.

In some implementations, the client computing device 105 includes a graphical user interface to display a visualization of the contact toolbar application 115. The display, for example, can indicate various types of computer telephony integration data, such as voice data, instant messaging data, short message service data, chat data, telephone network data, voice over internet protocol data, email data, or work item data. The display in the user interface can indicate a session state of the contact toolbar application 115 or the CRM application 120, such as an active state, a connected but inactive state, or a disconnected state.

Figure 6:
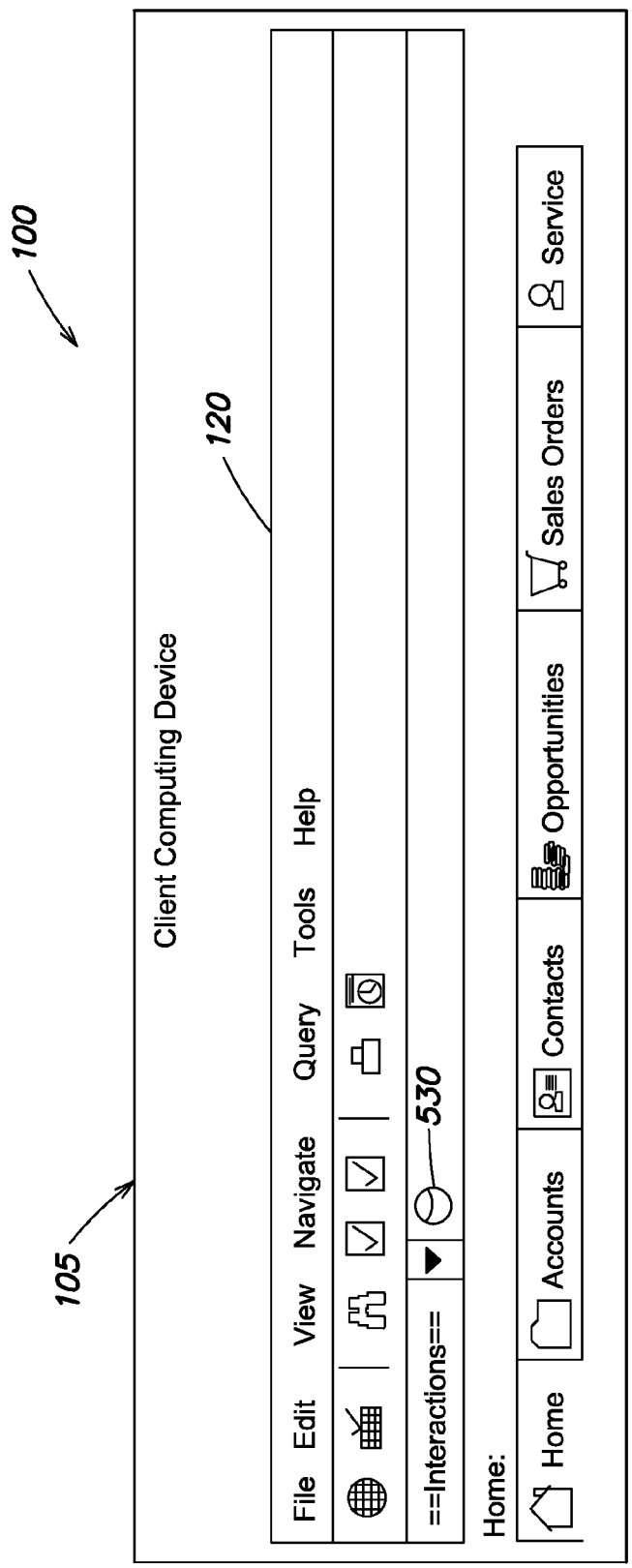
FIG. 6 is a display depicting one example of a client application on a client computing device, according to an illustrative implementation.

FIGS. 6-11 illustrate example displays of the CRM application 120 in a user interface of the client computing device 105. FIG. 6 illustrates a portion of the CRM application 120 with the display 530 indicating an active CRM session between the CRM application 120 and the contact toolbar application 115, e.g., via the integration channel. For example, the display 530 may be green to indicate the active CRM session. The active CRM session allows bidirectional communication between the contact toolbar application 115 and the CRM application 120 via the integration channel. During the active CRM session, the CRM application 120 is connected via the connection point 130 with the contact toolbar application 115 and ready to receive events, notifications, or other communications from the master connector plugin 125 of the contact toolbar application 115.

Figure 7:
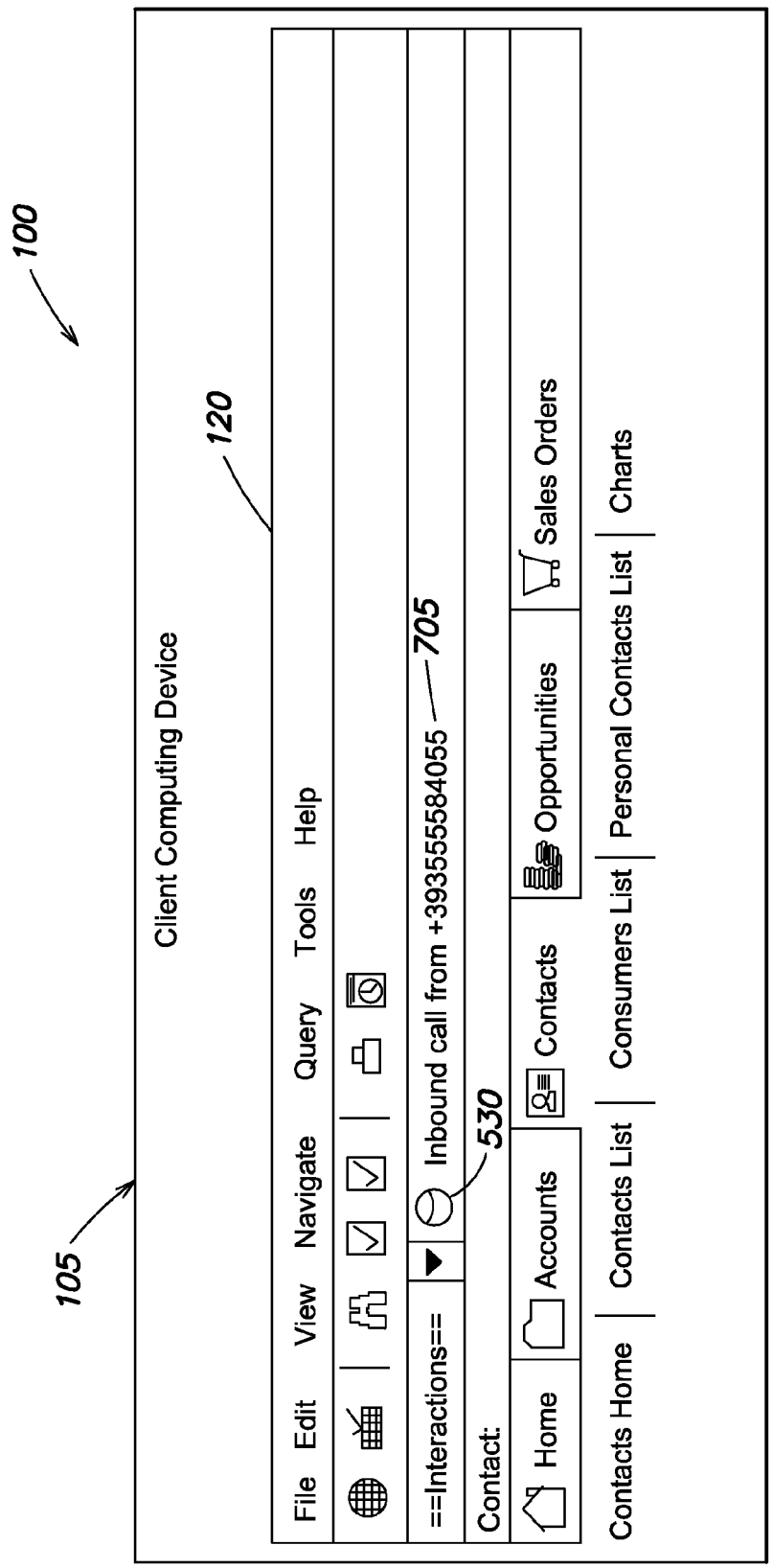
FIG. 7 is a display depicting one example of a client application on a client computing device, according to an illustrative implementation.

FIG. 7 illustrates a portion of the CRM application 120 with the display 530 indicating an active CRM session between the CRM application 120 and the contact toolbar application 115 via the integration channel. The display 530 can be coded (e.g., green) to indicate an active CRM session between the CRM application 120 and the contact toolbar application 115. In this example, the CRM application 120 has received a notification from the master connector plugin 125 of an incoming call 705, which can be identified in the display of the CRM application 120.

Figure 9:
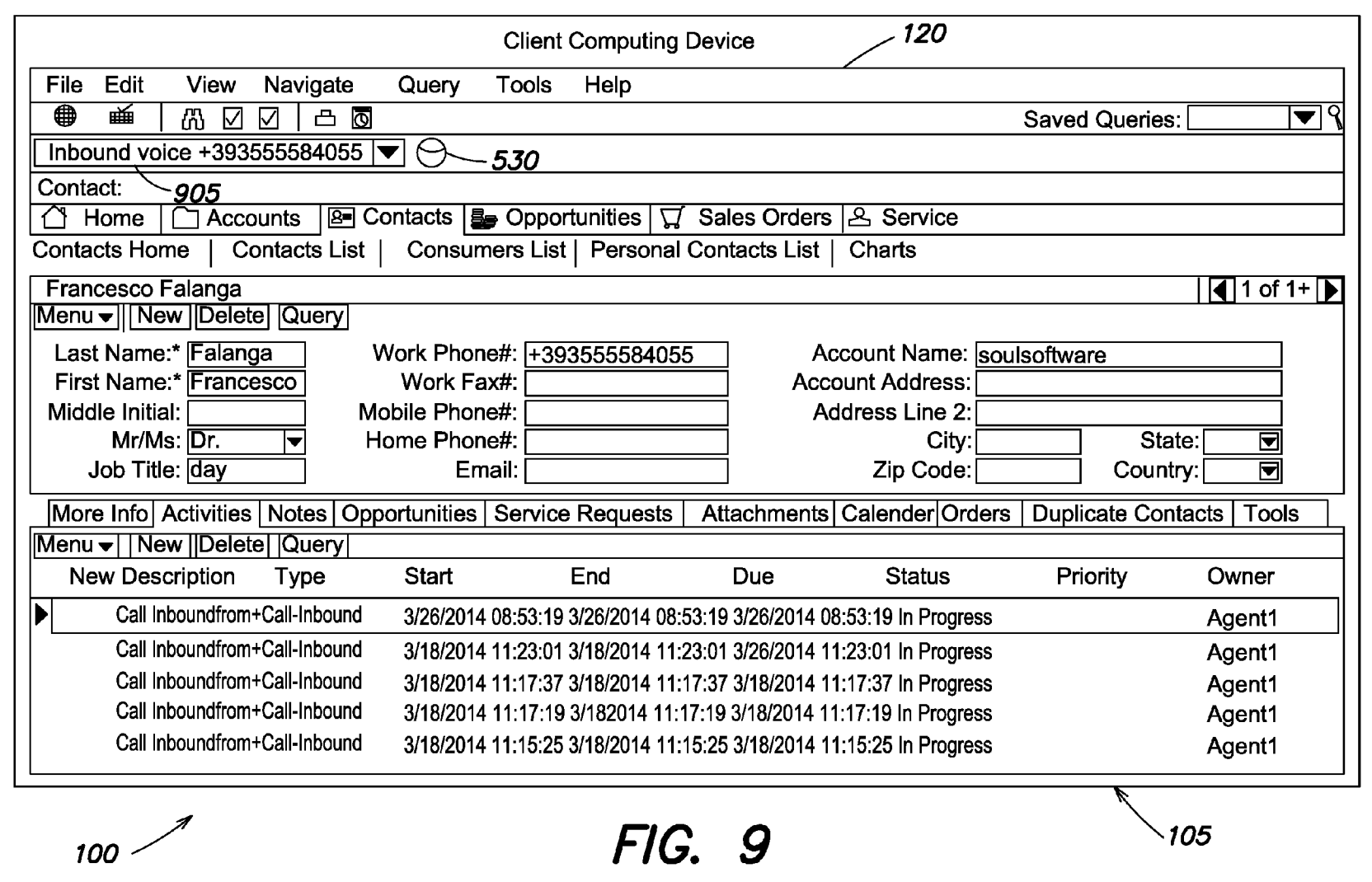

FIG. 8 illustrates a portion of the CRM application 120 with the display 530 indicating an active CRM session between the CRM application 120 and the contact toolbar application 115. The display 530 can be coded (e.g., green) to indicate an active CRM session or between the CRM application 120 and the contact toolbar application 115. In this example the CRM application 120 is in an active state and connected with the contact toolbar application 115 and ready to receive events, notifications, or other communications from the master connector plugin 125 of the contact toolbar application 115. FIG. 9 illustrates a portion of the CRM application 120 with the display 530 indicating an active CRM session between the CRM application 120 and the contact toolbar application 115, where the CRM application 120 has received an event, such as an inbound voice call identified for example in interface window 905.

Figure 10:
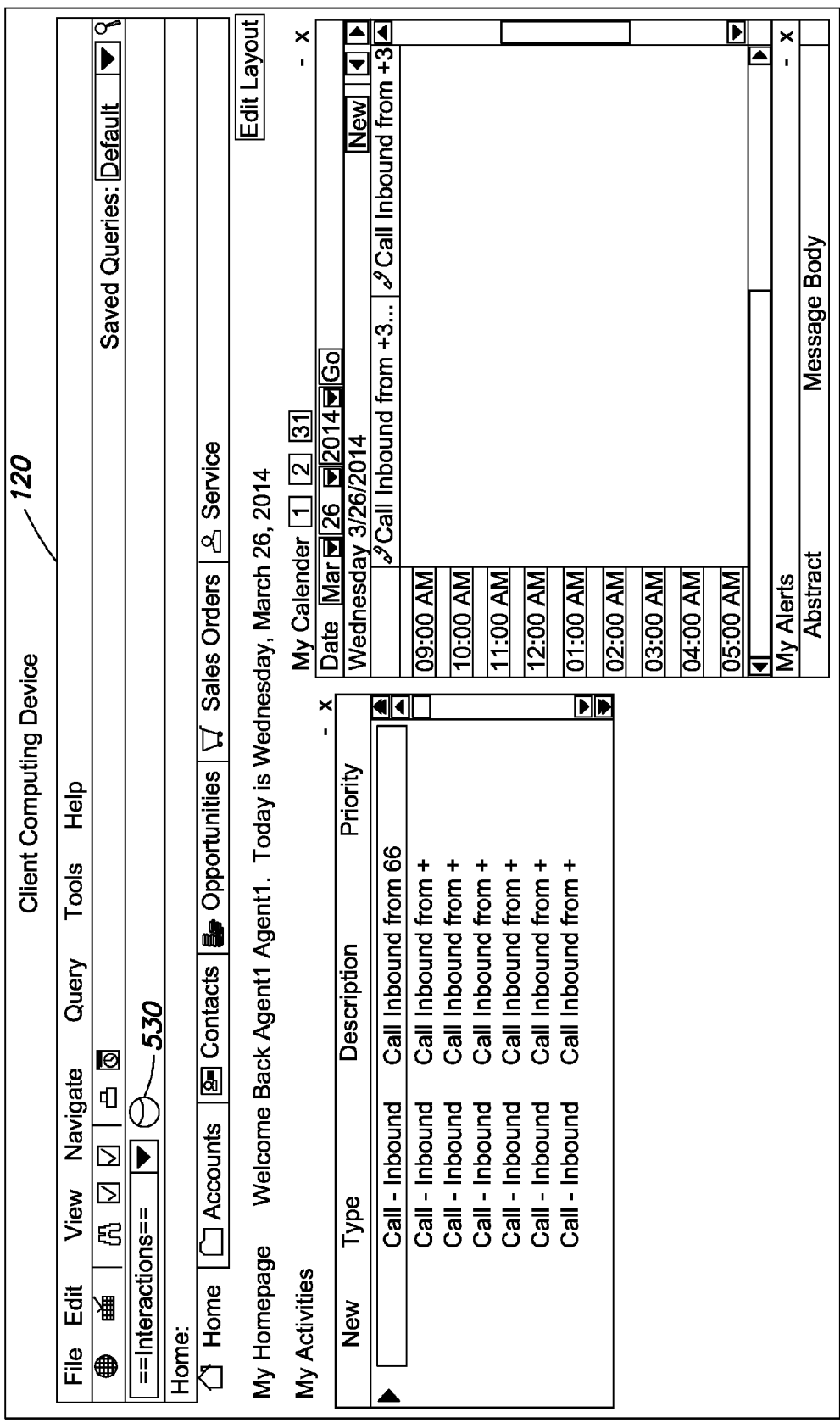
FIG. 10 is a display depicting one example of a client application on a client computing device, according to an illustrative implementation.

FIG. 10 illustrates a portion of the CRM application 120 with the display 530 indicating a connected but inactive CRM session or state between the CRM application 120 and the contact toolbar application 115. For example, the display 530 can be color coded (e.g., yellow) to indicate that the CRM application 120 is connected with the contact toolbar application 115 but is not an active connection through which telephony integration data is presently passing. For example, a different CRM application 120 may be active and communicating telephone integration data with the contact toolbar application 115 via the integration channel at this time.

Figure 11:
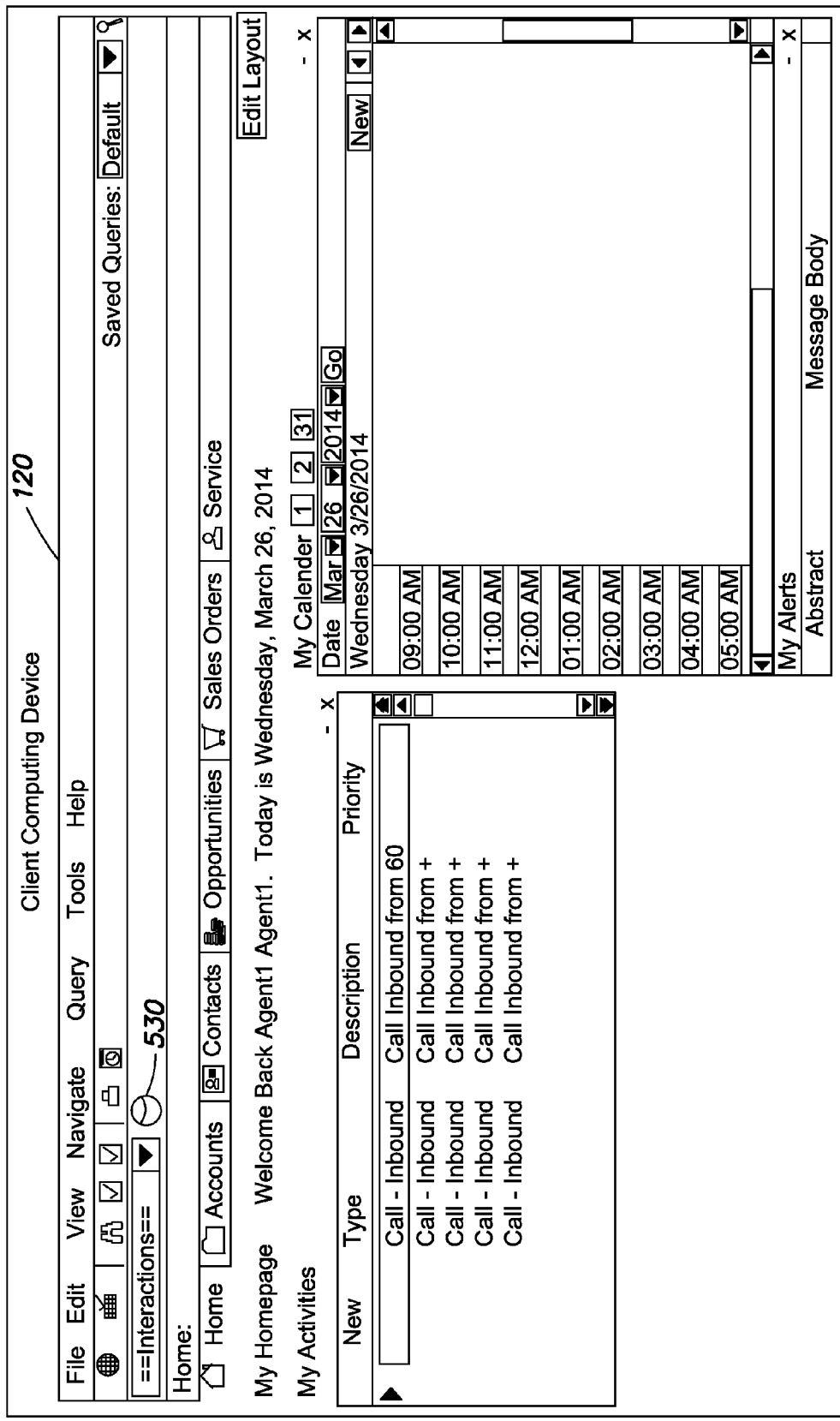
FIG. 11 is a display depicting one example of a client application on a client computing device, according to an illustrative implementation.

FIG. 11 illustrates a portion of the CRM application 120 with the display 530 indicating a disconnected CRM session or state between the CRM application 120 and the contact toolbar application 115. For example, the display 530 can be color coded (e.g., red) to indicate that the CRM application 120 is disconnected with the contact toolbar application 115 via the integration channel. For example, a different CRM application 120 may be active and communicating telephone integration data with the contact toolbar application 115 via the integration channel at this time.

Figure 13:
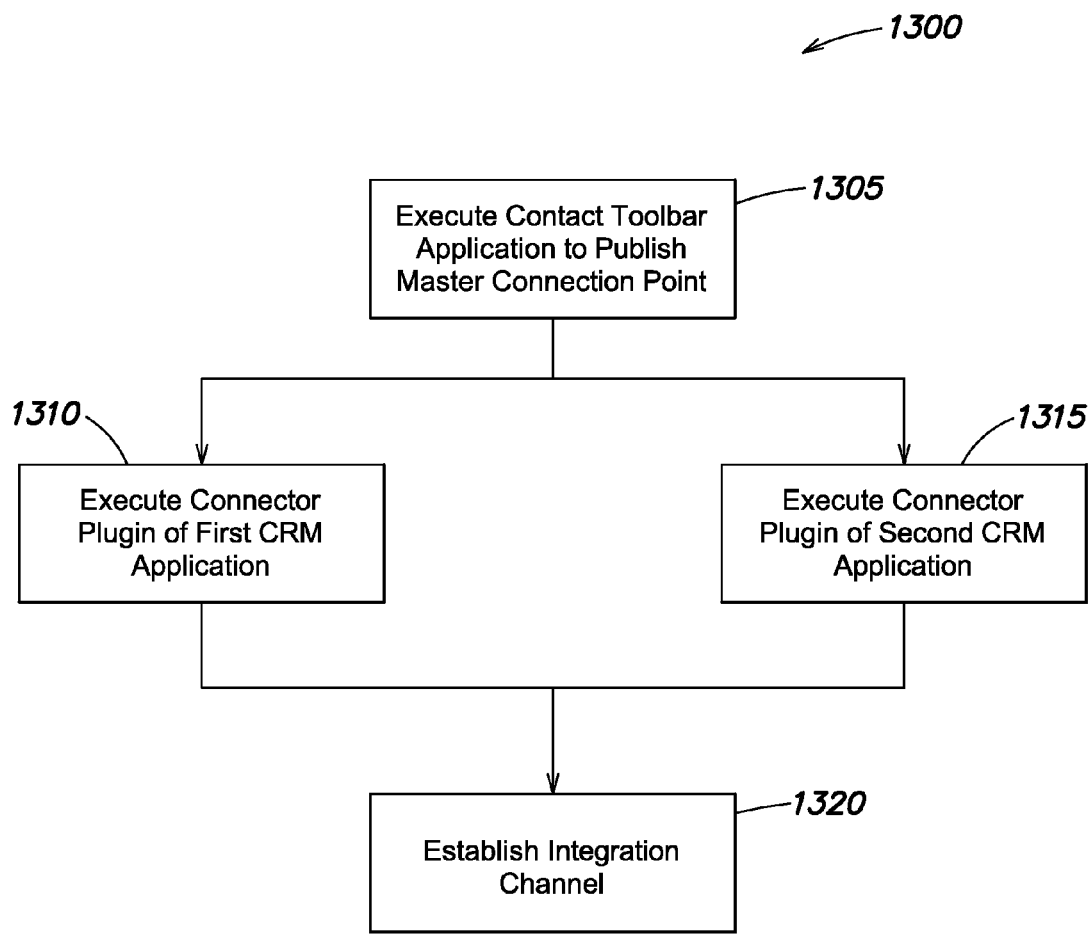
FIG. 13 is a flow diagram depicting an example method of client application interaction on a client computing device, according to an illustrative implementation.

FIG. 13 is a flow diagram depicting an example method 1300 of client application interaction on a client computing device, according to an illustrative implementation. The method 1300 can include executing the contact toolbar application 115 of the client computing device 105 to publish a connection point 130 (ACT 1305). For example, the processor of the client computing device 105 can execute the master connector plugin 125 of the contact toolbar application 115 to publish or identify an address for the connection point 130. The method 1300 can execute the connector plugin 135 of a first CRM application 120 (or other client application) to identify the connection point 130 and to establish a connection between the first CRM application 120 and the contact toolbar application 115 via the connection point 130 (ACT 1310). The method 1300 can execute the connector plugin 135 of a second CRM application 120 (or other client application) to identify the connection point 130 and to establish a connection between the second CRM application 120 and the contact toolbar application 115 via the connection point 130 (ACT 1315). The method 1300 can establish the integration channel 1205 on the client computing device 105 (e.g., on the user workstation 110) (ACT 1320). The integration channel 205 can be used for the real time exchange of computer telephony integration data between the contact toolbar application 115 and at least one of the first CRM or other client application 120 and the second CRM or other client application 120.

Referring to FIGS. 1-13, the environment 100 can include a contact center environment such as a call center having a plurality of client computing devices 105. The client computing devices 105 in the contact center environment can include at least one user workstation 110, at least one contact toolbar application 115, at least one CRM application 120, at least one master connector plugin 125, and at least one connector plugins 135. The contact toolbar application 115, the CRM applications 120 and their plugins or other components can provide computer telephony integration data for display in one or more user interfaces of the client computing device 105.

The contact toolbar application 115 or component thereof such as the master connector plugin 125 can generate or publish at least one connection point 130 on the client computing device 105, e.g., within the user workstation 110. The connection point 130 can be used to establish the integration channel 205. For example, the CRM applications 120 can execute the connector plugin 135 or other component to identify and establish a connection with the connection point 130. This can form the integration channel 205, e.g., a communications channel for the exchange of computer telephone integration data between the contact toolbar application 115 and the CRM applications 120 within the client computing device 105. The computer telephony integration data can include data about customers, employees, or people connected to a call with the user of the client computing device 105. The telephony integration can include telephony data, such as a phone number, identify of a caller, time details of a call, location of a caller, or telephone metadata, as well as other information such as customer details from a database associated with the CRM applications 120 that is not telephony data. The computer telephony integration data can be exchanged in real time between components of the user workstation 110. For example, during a call with a customer through the client computing device, the contact toolbar application 115 can communicate with the CRM application 120 to obtain telephony integration data via the integration channel 205.

The contact toolbar application 115 can include a script. The script can be installed on or executed by the client computing device 105 to transmit, receive, or obtain the computer telephony integration data via the integration channel 205 directly, e.g., via the CRM application 120 and not via an intermediary server or computer network communication between the contact toolbar application and an intermediary server such as the CRM server 1205. In some implementations, the contact toolbar application 115 can interact with one CRM application 120 to exchange computer telephony integration data via the integration channel 205, and can concurrently interact with another CRM application 120 to exchange computer telephony integration data via the integration channel 205.

The concurrent interaction need not be simultaneous. For example during a time period (e.g., of a phone call with a customer), the computer telephone integration data can be sequentially transmitted via the integration channel to the contact toolbar application 115 from multiple CRM applications 120. Transactions during this time period can be considered as real time or concurrent transactions as the contact toolbar application 115 (or the CRM applications 120) can access or display the information during a time period when it is of use to an operator of the client computing device 105 (e.g., during a phone call with a customer).

The CRM applications 120 and the contact toolbar application 115 can provide a display in a graphical user interface of the client computing device 105. The display can indicate an active session state with the contact toolbar application 115 via the integration channel 205, a connected but inactive state with the contact toolbar application 115 via the integration channel 205, and a disconnected session state with the contact toolbar application 115 via the interaction channel 205. The active session state can occur when the contact toolbar application 115 and the CRM application 120 are connected with the integration channel 205 via the connection point 130, and computer telephony data is being transmitted through the integration channel 205. The connected but inactive state can occur when the contact toolbar application 115 and the CRM application 120 are connected with the integration channel 205 via the connection point 130, but computer telephony data is not being transmitted through the integration channel 205. The inactive or disconnected session state can occur when the contact toolbar application 115 and the CRM application 120 is not connected with the integration channel 205 via the connection point 130, and computer telephony data is not being transmitted through the integration channel 205.

In some implementations, the contact toolbar application 115 executes within the user workstation 110 to provide or transmit an activation event to the CRM application 120, for example via the integration channel 205. The CRM application 120 can receive the activation event and in response transmit a command via the integration channel 205 to enter the active state. This may occur during a time period when a second CRM application 120 is in a connective but inactive state with the contact toolbar application 115. The contact toolbar application 115 can also receive a request command from the CRM application 120 to establish a connection with the connection point 130 and in response can provide a connect event to the CRM application 120 to include the CRM application 120 in the integration channel 205, or to allow the CRM application 120 to transmit and receive computer telephony data via the connection channel 205.

The client computing device 105 (or component thereof such as the contact toolbar application 115) can execute a script to establish an active session between the contact toolbar application 115 and the CRM application 120 for the real time exchange of computer telephony integration data via the integration channel 205. The contact toolbar application 115 or the CRM application 120 can be displayed in a user interface of the client computing device 105 and can indicate the session state (e.g., active, connected but inactive, or disconnected). For example color coded circular display mimicking an LED can be displayed, with green indicated an active state, yellow indicating a connected but inactive state, and red indicating a disconnected state of the associated component such as the CRM application 120.

The contact toolbar application 115 can receive and send computer telephony integration data. For example, the contact toolbar application 115 can receive a command from one CRM application, such as a request to make a call, and in response can send an event to the CRM application to dial a number to establish the call. The contact toolbar application 115 can receive and send multiple commands to multiple CRM applications 120.

In some implementations, the contact toolbar application 115 can receive a first connection request from a first CRM application 120, and can receive a second connection request from a second CRM application 120. For example, the CRM applications can request to register with the connection point 130, and this request can be received by the master connector plugin 125. The contact toolbar application 115 can establish, via the integration channel 205, a communication session between the CRM applications 120 and the contact toolbar application 115. The contact toolbar application 115 can provide computer telephony events (e.g., data) to the first CRM application 120 and can provide the same or different computer telephony events (e.g., data) to the second CRM application 120 via the integration channel 205 during the communication session.

In some implementations, the agent workstation 110 or its components (e.g., the master connector plugin 125 or the connector plugin 135) are middleware components or part of a software driver to enable the communication and management of computer telephony data in an enterprise application integration system. These components can be part of a software layer between the operating system of the client computing device 105 and applications of a distributed computing system (e.g., the CRM application 120). In some implementations, the contact toolbar application 115 and the CRM application 120 also include middleware components.

Figure 14:
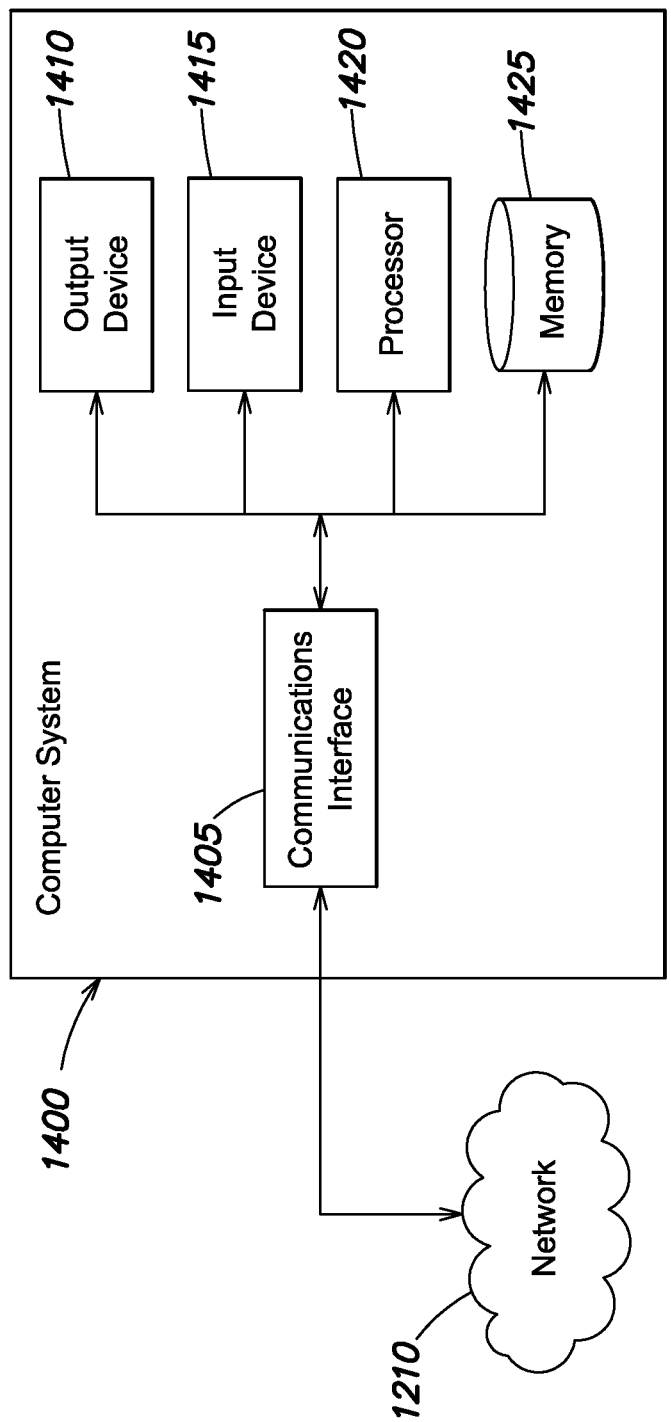
FIG. 14 is a block diagram illustrating a general architecture for a computer system that may be employed to implement elements of the systems and methods described and illustrated herein, according to an illustrative implementation.

FIG. 14 shows the general architecture of an illustrative computer system 1400 that may be employed to implement any of the computer systems discussed herein (including the client computing device 1105) in accordance with some implementations. The computer system 1400 can be used to provide information via the network 1210, for example to provide data to or from the CRM applications 120. The computer system 1400 includes one or more processors 1420 communicatively coupled to at least one memory 1425, one or more communications interfaces 1405, and one or more output devices 1410 (e.g., one or more display units) and one or more input devices 1415. The processors 1420 can be included in the client computing device 105.

The memory 1425 can include computer-readable storage media, and can store computer instructions such as processor-executable instructions for implementing the operations described herein. The client computing device 105 can include the memory 1425 to store computer telephone integration data, customer or potential data, employee data, or marketing data, for example. The processors 1420 can execute instructions stored in the memory 1425 and can read from or write to the memory information processed and or generated pursuant to execution of the instructions.

The processors 1420 can be communicatively coupled to or control the communications interfaces 1405 to transmit or receive information pursuant to execution of instructions. For example, the communications interfaces 1405 can be coupled to a wired or wireless network, bus, or other communication means and can allow the computer system 1400 to transmit information to or receive information from other devices (e.g., other computer systems). One or more communications interfaces 1405 can facilitate information flow between the components of the client computing device 105. In some implementations, the communications interfaces 1405 can be configured (e.g., via hardware components or software components) to provide a website as an access portal to at least some aspects of the computer system 1400. Examples of communications interfaces 1405 include user interfaces.

The output devices 1410 can allow information to be viewed or perceived in connection with execution of the instructions. The input devices 1415 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

The term "data processing system" or "computing device" "module" "engine" or "component" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The client computing device 105 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the client computing device 105) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the environment 100 or system 1400 can include clients and servers. A client and server are generally remote from each other and typically interact through a communication network (e.g., the network 1210). The relationship of client and server arises by virtue of computer programs running on the respective computers and having a client-server relationship to each other. Data generated at the client device (e.g., a result of the user interaction) can be received from the client device at the server (e.g., received by the client computing device 105 from the CRM server 1205).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the environment 100 or the client computing device 105 can be a single module or a logic device having one or more processing circuits.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the CRM applications 120 can include or be wired for management (WFM) or enterprise resource planning (EFP) computer system management applications. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system of facilitating computer telephony integration between customer relationship management (CRM) applications on client computing devices in a contact center environment, comprising:
   a client computing device in the contact center environment, the client computing device including a processor and memory;
   the client computing device having a user workstation including a contact toolbar application, a first CRM application, and a second CRM application to provide computer telephony integration data for display by the client computing device;
   the contact toolbar application that executes on the client computing device to provide a connection point within the user workstation;
   the client computing device that executes a connector plugin of the first CRM application to identify the connection point and to establish a first connection with the connection point;
   the client computing device that executes a connector plugin of the second CRM application to identify the connection point and to establish a second connection with the connection point; and
   the user workstation that establishes an integration channel over a data network via the connection point between the contact toolbar application, the first CRM application, and the second CRM application, for real time exchange of the computer telephony integration data between the contact toolbar application and at least one of the first CRM application and the second CRM application.

2. The system of claim 1, comprising:
   the contact toolbar application including a script that executes on the client computing device to obtain the computer telephony integration data via the integration channel from at least one of the first CRM application and the second CRM application directly and not via an intermediary server.

3. The system of claim 1, comprising:
   the contact toolbar application configured to obtain the computer telephony integration data from at least one of the first CRM application and the second CRM application via the integration channel and not via a computer network communication with an intermediary server.

4. The system of claim 1, wherein the integration channel is exclusively for use of the contact toolbar application, the first CRM application, and the second CRM application for the real time exchange of computer telephony integration data.

5. The system of claim 1, wherein the computer telephony integration data includes first data and second data, comprising:
   the contact toolbar application interacting with the first CRM application for real time exchange of the first data between the contact toolbar application and the first CRM application via the integration channel, and concurrently interacting with the second CRM application for real time exchange of the second data between the contact toolbar application and the second CRM application via the integration channel.

6. The system of claim 1, comprising:
   each of the first CRM application and the second CRM application providing a display in a graphical user interface of the client computing device, the display indicating one of an active session state with the contact toolbar application, a connected but inactive state with the contact toolbar application, and a disconnected session state with the contact toolbar application.

7. The system of claim 1, comprising:
   the first CRM application providing a display in a graphical user interface of the client computing device, the display configured to indicate three states, a first state of the three states indicating an active session state with the contact toolbar application, a second state of the three states indicating a connected but inactive state with the contact toolbar application, and a third state of the three states indicating a disconnected session state with the contact toolbar application.

8. The system of claim 1, comprising:
   the contact toolbar application configured to provide an activation event to place the first CRM application in an active session state with the contact toolbar application via the integration channel, with the second CRM application in a connected but inactive state with the contact toolbar application via the integration channel.

9. The system of claim 1, comprising the contact toolbar application executing on the client computing device to:
   receive, from the first CRM application, a command to establish the first connection with the connection point; and
   provide, responsive to the command, a connect event to the first CRM application to establish the first connection with the connection point.

10. The system of claim 1, comprising:
    the client computing device having a graphical user interface to display the contact toolbar application, the display indicating at least two types of computer telephony integration data selected from a group consisting of voice data, instant messaging data, chat data, telephone network data, voice over internet protocol data, email data, work item data, and short message service data.

11. The system of claim 10, comprising:
the display indicating at least one of an active session state with the contact toolbar application, a connected but inactive state with the contact toolbar application, and a disconnected session state with the contact toolbar application.

12. The system of claim 1, comprising:
the client computing device executing a script to establish an active session state for the real time exchange of computer telephony integration data between the contact toolbar application and at least one of the first CRM application and the second CRM application via the integration channel; and the contact toolbar application and at least one of the first CRM application and the second CRM application displaying an indication of the active session state in a graphical user interface of the client computing device.

13. The system of claim 1, comprising the contact toolbar application configured to:
receive a first command from the first CRM application, and, responsive to the first command, send a first event to the first CRM application; and
receive a second command from the second CRM application, and, responsive to the second command, send a second event to the second CRM application.

14. The system of claim 1, comprising the contact toolbar application configured to:
receive a first connection request from the first CRM application;
receive a second connection request from the second CRM application;
establish, via the integration channel, a communication session between the first CRM application, the second CRM application, and the contact toolbar application;
provide a computer telephony integration event to the first CRM application via the integration channel during the communication session; and
provide a computer telephony integration event to the second CRM application via the integration channel during the communication session.

15. The system of claim 1, comprising:
the user workstation configured to establish a communication session via the integration channel between the first CRM application and the second CRM application.

16. A computer implemented method of facilitating interaction between customer relationship management (CRM) applications in a contact center environment on a client computing device having a user workstation, the user workstation including a contact toolbar application, a first CRM application, and a second CRM application, comprising:
executing, by one or more processors of the client computing device, the contact toolbar application of the client computing device to provide a connection point within the user workstation of the client computing device;
executing, by the client computing device, a connector plugin of the first CRM application to identify the connection point and to establish a first connection between the first CRM application and the contact toolbar application via the connection point;
executing, by the client computing device, a connector plugin of the second CRM application to identify the connection point and to establish a second connection between the second CRM application and the contact toolbar application via the connection point; and
establishing, by the user workstation, an integration channel over a data network via the connection point between the contact toolbar application, the first CRM application, and the second CRM application, for real time exchange of computer telephony integration data between the contact toolbar application and at least one of the first CRM application and the second CRM application.

17. The method of claim 16, wherein the integration channel is exclusively for use of the contact toolbar application, the first CRM application, and the second CRM application for the real time exchange of computer telephony integration data, comprising:
denying at least one additional application from accessing the integration channel.

18. The method of claim 16, comprising:
establishing, by the user workstation, a loosely coupled distributed system between the first CRM application and the second CRM application.

19. The method of claim 16, comprising:
obtaining, by the contact toolbar application, the computer telephony integration data from at least one of the first CRM application and the second CRM application via the integration channel and not via a computer network communication with an intermediary server.

20. The method of claim 16, wherein the computer telephony integration data includes first data and second data, comprising:
providing, by the contact toolbar application, real time exchange of the first data between the contact toolbar application and the first CRM application via the integration channel; and
concurrently providing real time exchange of the second data between the contact toolbar application and the second CRM application via the integration channel.

21. A computer readable storage device storing instructions that when executed by one or more data processors, cause the one or more data processors to perform operations for interaction between customer relationship management (CRM) applications on a client computing device having a user workstation, the user workstation including a contact toolbar application, a first CRM application, and a second CRM application, the operations comprising:
executing the contact toolbar application of the client computing device to provide a connection point within the user workstation of the client computing device;
executing, by the client computing device, a connector plugin of the first CRM application to identify the connection point and to establish a first connection between the first CRM application and the contact toolbar application via the connection point;
executing, by the client computing device, a connector plugin of the second CRM application to identify the connection point and to establish a second connection between the second CRM application and the contact toolbar application via the connection point; and
establishing, by the user workstation, an integration channel over a data network via the connection point between the contact toolbar application, the first CRM application, and the second CRM application, for real time exchange of computer telephony integration data between the contact toolbar application and at least one of the first CRM application and the second CRM application.

* * * * *